(Model.)

3 Sheets—Sheet 1.

T. SPEDDING.
FRUIT PARING AND CORING MACHINE.

No. 341,514. Patented May 11, 1886.

Witnesses:
T. H. Parsons.
S. R. Thompson.

Thomas Spedding,
Inventor.

(Model.) 3 Sheets—Sheet 2.

T. SPEDDING.
FRUIT PARING AND CORING MACHINE.

No. 341,514. Patented May 11, 1886.

Witnesses:
T. F. Parsons.
S. R. Thompson

Thomas Spedding,
Inventor.

(Model.) 3 Sheets—Sheet 3.

T. SPEDDING.
FRUIT PARING AND CORING MACHINE.

No. 341,514. Patented May 11, 1886.

Witnesses:
T. H. Parsons.
S. R. Thompson.

Thomas Spedding,
Inventor.

UNITED STATES PATENT OFFICE.

THOMAS SPEDDING, OF DUNN, COUNTY OF HALDIMARD, ONTARIO, CANADA.

FRUIT PARING AND CORING MACHINE.

SPECIFICATION forming part of Letters Patent No. 341,514, dated May 11, 1886.

Application filed March 20, 1885. Serial No. 159,536. (Model.)

*To all whom it may concern:*

Be it known that I, THOMAS SPEDDING, of the township of Dunn, in the county of Haldimard and Province of Ontario, Canada, have invented certain new and useful Improvements in Fruit Parers and Corers, of which the following is a specification.

Figure 1:
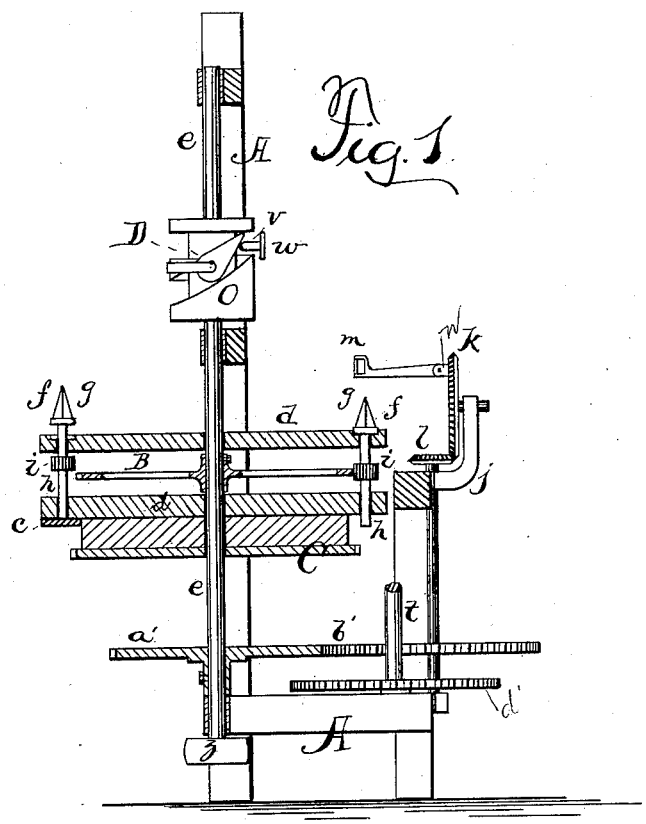
Figure 2:
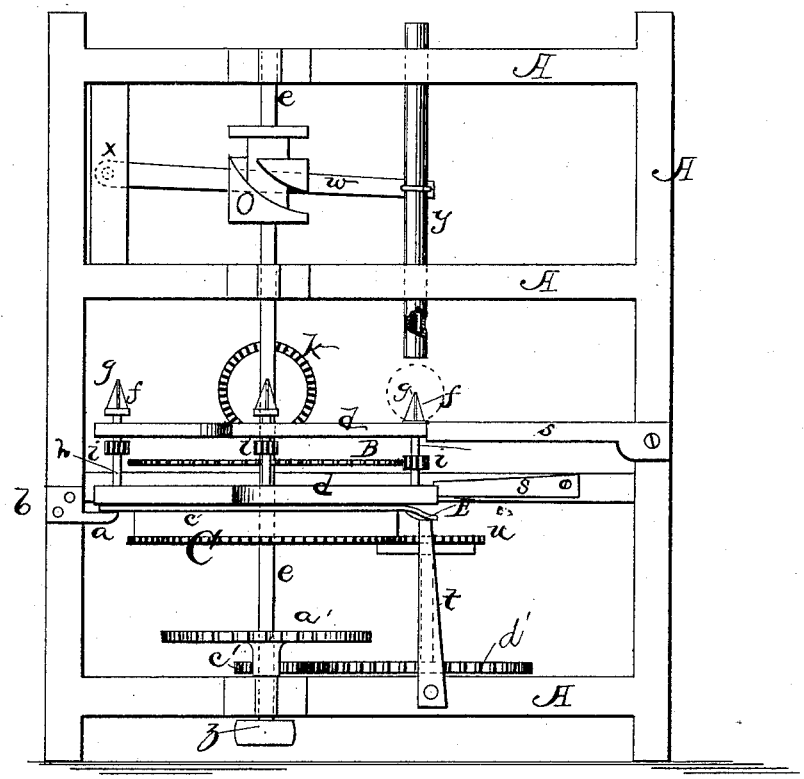
Figure 3:
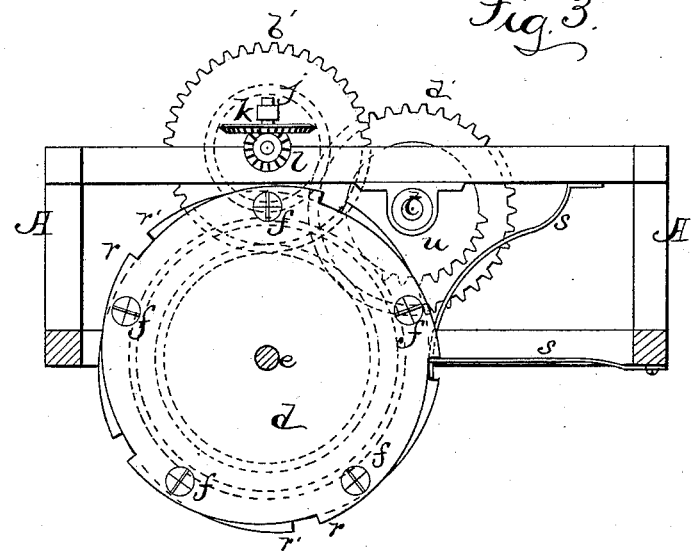
Figure 4:
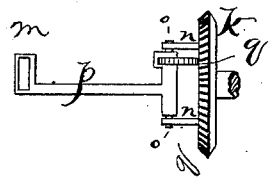
Figure 5:
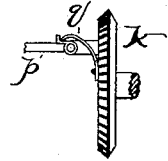

In the drawings, Figure 1 is a side view of my machine, partly in section. Fig. 2 is a back view. Fig. 3 is a sectional plan, and Figs. 4 and 5 are details of paring-knife.

A A represent the frame-work.

At $b$ is attached an arm, $a$, on which is set a partly-circular-like bed-piece, $c$, which acts a double purpose, as will be fully described. On this piece $c$ sets the circular-shaped fork-frame $d\ d$, which revolves loosely around the shaft $e$. In this frame $d\ d$, at equal distances apart, are the forks $f\ f\ f\ f$. Each fork is constructed with three or more pointed blades, $g$, and a shaft, $h$, having rigidly attached to it a pinion, $i$.

On the frame A (see Figs. 1 and 3) is secured an arm, $j$, which supports the gear-wheel $k$, into which meshes another smaller wheel, $l$, by which the power is communicated. On the wheel $k$ is attached the paring-knife $m$, held in the required position by the following means: $n\ n$ are two lugs in which set the ends of knife-arm $o\ o$. The knife is secured upon the end of the elongated arm $p$. A spring, $q$, fastened as shown, causes the knife to follow the shape of and pare the fruit. $r\ r'$ are notches in upper and lower part of frame $d\ d$, (see Fig. 3,) and $s\ s$ are two stiff springs engaging in same and holding the frame stationary while the fork is under the knife; otherwise the constantly-revolving shaft $e$, although running loosely through the frame, would have a tendency to disturb it.

B is a gear-wheel firmly attached to shaft $e$, which, when the fork is under the knife, engages with pinion $i$, and thereby revolves the fork and fruit thereon.

C is another gear-wheel firmly attached to the base of the circular fork-frame, which at every revolution of shaft $t$, by means of the partly-toothed wheel $u$, is moved far enough to bring the fruit which has just been pared from under the paring-knife to the coring device.

This is constructed and operates as follows: On shaft $e$, at its upper extremity, is attached a circular drum-shaped device, O, having on its surface a peculiar running groove. In this groove travels a button, $v$, attached to the center of a long arm, $w$, whose one end is pivoted to the frame at $x$, and the other end fastened to a hollow coring-knife, $y$.

D is a nicely-balanced pin suitably attached to drum O, which has the effect of dropping the corer once to every two revolutions of the shaft.

It not being necessary for the forks to revolve only when under the paring-knife, the bed-piece $c$ only extends from about where the coring-knife does its work until the paring-knife is almost reached. At E this bed-piece is bent down, as shown, in order to allow the fork-shafts to be raised, thereby throwing the pinion out of gear and causing the fork to remain stationary, which permits of the putting on of the unpared fruit and taking off of the pared fruit.

The operation of the machine is as follows: The fruit to be pared is placed on the forks and power is communicated to the machine by means of the pulley $z$, (or in small machines a crank can be suitably arranged to be worked by hand.) This revolves the wheels $a'\ b'$, which in turn revolve the shafts and wheels $c'\ d'\ l\ k$. When the first apple is brought under the paring-knife it is rapidly pared. When the teeth on the wheel $u$ mesh into the wheel on the under part of the circular frame $d\ d$ and cause it to revolve just far enough to bring the pared apple under the corer, and an unpared apple (or other fruit) under the paring-knife, the coring-knife, by the means already described, then descends and performs its work. The shaft of the fork bearing the now pared and cored apple, which has been rapidly revolving from the time it reached the paring-knife, now strikes the depressed end of the bed-piece $c$, and at the next revolution of wheel $u$ is raised, throwing its pinion $i$ out of gear with the wheel B, and ceases to revolve, when the apple is then taken off and an unpared one replaced, and so on.

I claim—

1. In a fruit-parer, a series of fruit-forks mounted upon vertical shafts which are capable of movement up and down, and are equipped with pinions, as shown, in combination with a rotatable frame in which said forks are held, a central gear for engagement with the pinions on the fork-shafts, and a cam-surface suitably located and held to disengage the pinions from the central gear during a portion of the rotation of the frame, as set forth.

2. In a fruit-parer, the combination, with the main shaft, of the gear B, secured thereon, a rotatable frame on the main shaft, movable independently thereof, fruit-forks having vertical shafts provided with pinions, as described, capable of being moved vertically, a cam-plate suitably fixed to disengage the fruit-fork pinion from the gear B during a portion of its circuit, a gear, C, secured upon the frame, and mechanism, substantially as described, for giving intermittent movement to gear C, as set forth.

3. The combination, with the fruit fork or forks, the main shaft, and a cam-grooved drum mounted thereon, of the coring tube or device $y$, mounted at a point over the line of travel of the fruit-forks, a pivoted arm, $w$, to the free end of which part $y$ is secured, and a projection or lug on said part $w$, which enters the groove in the drum and is caused to elevate and depress the coring-tube, as set forth.

4. The combination of the fruit fork or forks, the main shaft, and a hub or drum, O, mounted thereon, said hub having a double cam-groove, and a switch pin or piece, D, secured on hub or drum O at the entrance to said double groove, a vertically-movable corer, $y$, and a pivoted arm, $w$, to which is secured the corer $y$, said pivoted arm having a projection or pin, $v$, extending into the cam-groove, and operating substantially in the manner and for the purpose set forth.

In testimony whereof I affix my signature in presence of two witnesses.

THOMAS SPEDDING.

Witnesses:
WILLIAM D. SWAYZE,
OWEN DRAKE.